April 21, 1931. W. H. HOLT 1,801,349
METAL TRANSFER AND HEATING MECHANISM
Filed Oct. 6, 1927   2 Sheets-Sheet 1
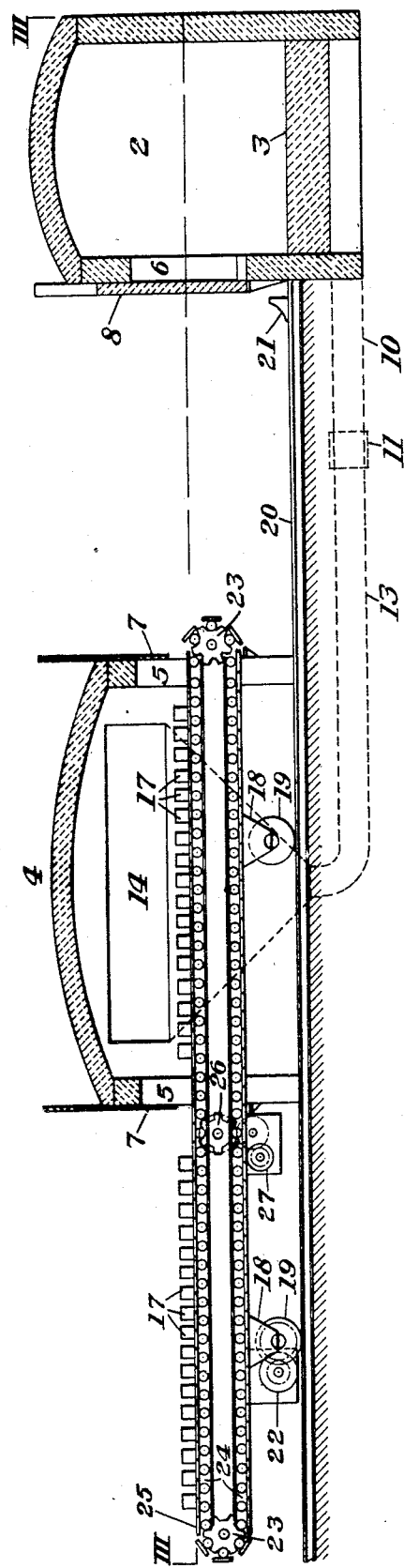
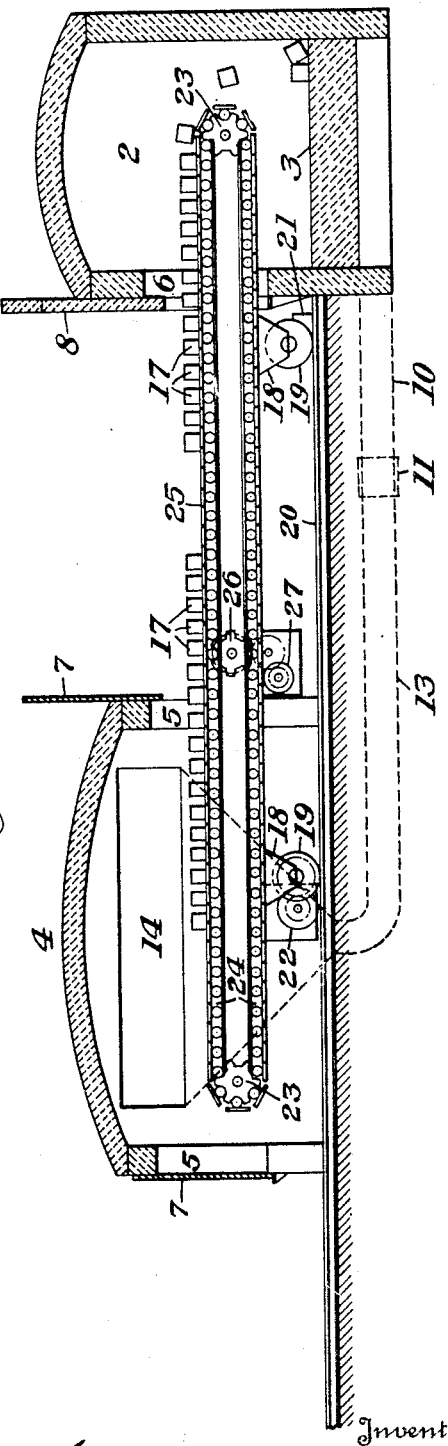

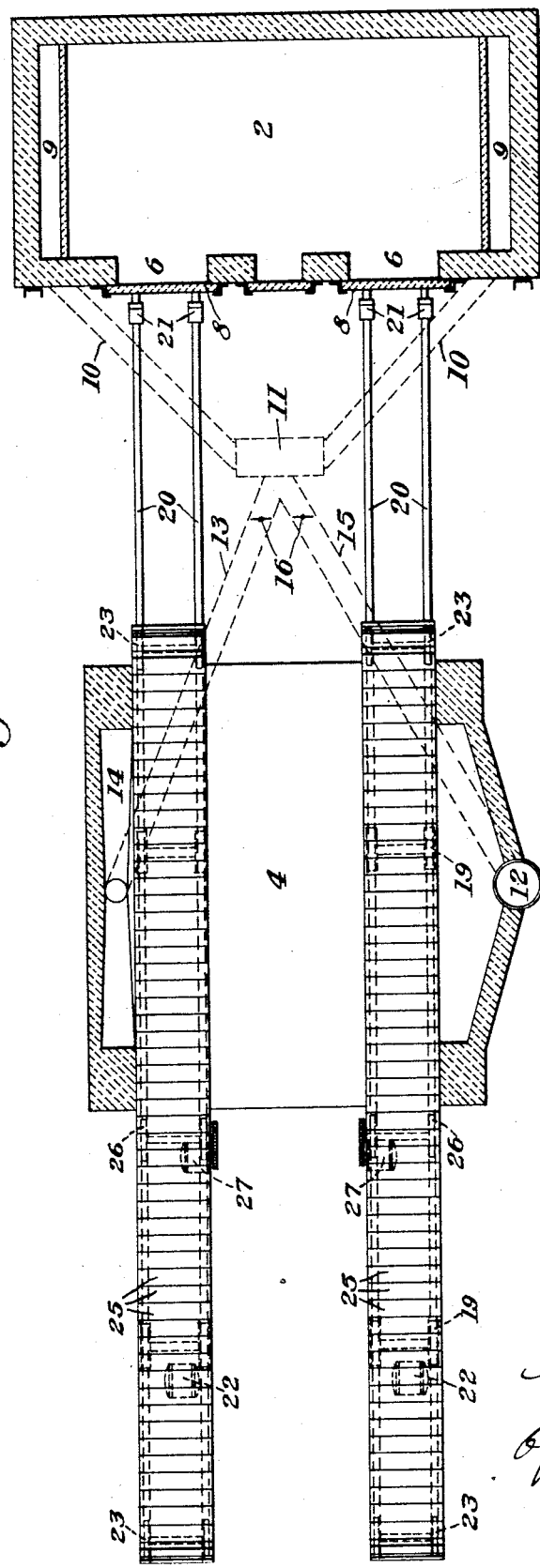

Patented Apr. 21, 1931

1,801,349

UNITED STATES PATENT OFFICE

WALTER H. HOLT, OF PITTSBURGH, PENNSYLVANIA

METAL TRANSFER AND HEATING MECHANISM

Application filed October 6, 1927. Serial No. 224,374.

My invention relates to the art of heating metal, and more particularly to means for pre-heating metal, as billets, slabs, etc., prior to their introduction to a furnace, and with utilization of the waste heat thereof.

The invention embodies means for introducing metal to be heated into a pre-heating furnace in which the heat of the waste gases of a suitable melting furnace, as an open hearth furnace, is utilized, for heat conservation, economy, and other advantages arising therefrom.

Generally stated, the metal to be heated is introduced by means of a traveling carriage provided with a conveyor, into the interior of a heating furnace, after which the carriage is moved to introduce its delivery end into the utilizing furnace, with discharge thereinto of the pre-heated billets, etc., with means for actuating the carriage, the conveyor, means providing for circulation of the waste gases, etc., as shall be more fully hereinafter described.

In the drawings illustrating one preferred embodiment of the invention:

Fig. 1 is a longitudinal vertical section through the preheating furnace and the utilizing furnace, and showing the carriage in its initial position for charging and pre-heating;

Fig. 2 is a similar view showing the carriage advanced for delivery of the heated units to the utilizing furnace;

Fig. 3 is a horizontal sectional view on the line III—III of Fig. 1.

Referring to the drawings, 2 is the utilizing furnace which may be of the usual open hearth type, onto the floor 3 of which the pre-heated billets, etc., are to be delivered.
4 is the pre-heating furnace, suitably located with relation to furnace 2 to provide for travel of the carriage and having doors 5—5 in its opposite side walls, in registering position with the door opening 6 in the front wall of furnace 2. Said door openings are provided with suitable opening and closing doors 7 and 8 respectively, adapted to be opened and closed at different stages of the operation for conservation of the heat and retention of the gases.

The open hearth furnace 2 is provided with the usual regenerative checker-work, not shown, whereby the waste gases passing downwardly through flue openings 9, at one end or the other, are utilized in the usual way for heating the checker-work for alternate heating of incoming air, as is well understood.

Ordinarily, the resulting waste gases pass to the stack and are delivered to the atmosphere, although still retaining a heat temperature of from 1500° to 1700° F.

With my invention I utilize such waste heat by introducing the waste gases into one end of the heating furnace 4, for passage therethrough, and finally outward to the stack.

For such purpose any suitable flue arrangement is provided, as by conduits 10, leading from the flues 9 to manifold 11, from which hot gases may be directed either to one end of the pre-heating furnace for passage therethrough and out of the stack, or directly to the stack 12.

In such arrangement a flue 13 leads from manifold 11 to the open distributing port manifold 14 at one end of the pre-heating furnace 4 for circulation therethrough, finally passing outwardly through stack 12.

Otherwise, when desired, the gases may be taken directly by a similar flue 15 from the manifold to the stack, flues 13 and 15 being provided with suitable valves 16 for such control.

For the purpose of introducing the billets or other units 17 to the interior of the pre-heating furnace 4, I provide a carriage of suitable construction mounted by pedestals 18 on wheels 19 traveling on tracks 20 which extend underneath the pre-heating furnace and in opposite directions therefrom, terminating at the front of the utilizing furnace 2, preferably with limiting abutments 21.

The carriage is propelled forwardly and backwardly by any suitable means, as an electric motor 22, geared with one of the truck axles, as indicated in Fig. 1. By suitable trolley and control mechanism, not shown, current may be supplied to the motor for advance, retraction, stoppage and starting of the motor, dependent upon the desired movements of the carriage.

At each end the carriage is provided with terminal sprocket-wheels 23 around which pass the continuous chains 24 having the supporting slats 25, by which the metal units are supported and progressed, with the movement of the carriage, and independent thereof, during either stationary or moving condition of the carriage itself.

For such purpose a driving sprocket 26 is provided at any suitable location on the carriage, actuated from motor 27 through suitable gearing, as also indicated in Fig. 1. Said motor, like motor 22, is provided with a current supplying trolley and proper control, rheostat, etc.

As thus constructed and arranged the metal units 17 may be delivered upon the outer portion of the conveyor mechanism of the carriage, when extended beyond the pre-heating furnace, as in Fig. 1. When otherwise empty, such units may be progressed along the upper portion of the carriage, when stationary, into the interior of the pre-heating furnace, where they will be acted upon by the circulating gases therein, becoming pre-heated to the desired extent.

During such pre-heating, a second charge of metal units may be laid upon the outer portion of the conveyor, and when the first charge is sufficiently hot after exposure of the waste gases within furnace 4, the carriage is then moved over toward the melting furnace 2, and with its end projecting into the furnace, as in Fig. 2.

The conveyor is then started at slow speed by its motor 27 whereby to deliver the metal units one by one over the end of the conveyor onto the hearth of the furnace. At the same time the carriage is slowly moved backwardly, whereby to withdraw the delivery end of the conveyor and thus discharge its load evenly across the hearth until all of the charge of pre-heated units are delivered.

In the meantime the second charge of metal units will have been carried forwardly a corresponding distance, and when the last of the pre-heated units is discharged the movement of the conveyor is terminated. The carriage then continues its backward movement and is stopped at the position shown in Fig. 1, at which time the next succeeding charge to be delivered will be located in the interior of the pre-heating furnace.

The operation is continued intermittently, with sufficient rest intervals for proper pre-heating and melting of the charge in furnaces 4 and 2 respectively, under the control and judgment of the operator.

As shown in Fig. 3, I preferably provide the carriage and conveyor mechanism in duplicate, providing for alternating movements, and it will be, of course, understood that the number and arrangement of the conveyors may vary within wide limits to adapt the invention to varying conditions of application.

The apparatus may be utilized in connection with any kind of furnace, either open hearth, air or electric, or for charging directly into a cupola, or for ordinary heating.

It will also be understood that the pre-heating furnace may be entirely or partly heated by other means than waste gases from the utilizing furnace, as will be understood by those skilled in the art.

Also, that any suitable means for moving the carriage or the conveyor thereon may be substituted for the means shown, within the scope of the invention.

It will be understood that the construction may be changed and varied by the skilled mechanic or builder in design, proportions, or various other features or details, but that all such changes are to be considered as within the scope of the following claims.

What I claim is:

1. The combination with a utilizing furnace, of a pre-heating furnace heated by the waste gases therefrom, both of said furnaces having registering openings on a common level, a connecting trackway, a carriage on said trackway provided with a metal supporting conveyor, and means for actuating the conveyor to advance its contents for delivery into the utilizing furnace through the opening thereof.

2. In combination, a pre-heating furnace, a receiving furnace in advance thereof having a doorway, a connecting trackway, a carriage movable on said trackway through the pre-heating furnace towards and from the receiving furnace, propelling means therefor, a conveyor mounted on the carriage, and actuating means therefor whereby the carriage may be moved through said doorway to delivery position with relation to the receiving furnace and the conveyor may be actuated to deliver its contents to the interior of the receiving furnace.

3. In combination, a pre-heating furnace having oppositely arranged clearance openings on a common level, means for supplying heat to the pre-heating furnace, a receiving furnace in advance thereof having a clearance opening on said level, a trackway connecting the furnaces below said openings, a carriage movable on said trackway through the clearance openings of the pre-heating furnace towards and from the receiving furnace and through the clearance opening thereof, a conveyor mounted on the carriage, means for moving the carriage, and means for moving the conveyor on the carriage.

4. In combination, a main heating furnace having a gas outlet conduit, a pre-heating furnace having a gas supply port at one end and a gas outlet port at the other end, valve controlled conduits communicating with the gas outlet conduit of the main heating furnace and with the gas supply port and the gas outlet port respectively of the pre-heating furnace, and a carrier movable through the pre-heating furnace and adapted to deliver metal supported thereon to the main heating furnace and to back from the latter to the pre-heating furnace.

5. In combination, a receiving furnace, a furnace arranged in communication therewith to receive and be pre-heated by the waste gases from the receiving furnace, and a carriage of a length to bridge the space between said furnaces and at the same time extend partly into both of them.

6. In combination, a receiving furnace, a furnace arranged in communication therewith to receive and be pre-heated by the waste gases from the receiving furnace, a carriage movable toward and away from said furnaces, a conveyor on the carriage, said carriage and conveyor being of a length to bridge the space between said furnaces and to enable the conveyor at the same time to extend partly into both furnaces.

7. In combination, a receiving furnace, a furnace arranged in communication therewith to receive and be preheated by the waste gases from the receiving furnace, a carriage movable between and toward and away from said furnaces, an endless conveyor on the carriage, said carriage and conveyor being of a length to bridge the space between said furnaces and to enable the conveyor at the same time to extend partly into both furnaces, the second mentioned furnace having a doorway through which the conveyor may be projected to enable loading exteriorly of the second mentioned furnace.

8. In combination, a receiving furnace, a furnace spaced therefrom, a conduit to convey waste gases from the receiving furnace to the second furnace to preheat the latter, the facing walls of the furnaces at the space between them having aligned door openings, a carriage movable toward and away from the receiving furnace, a conveyor on said carriage operable independently thereof, said carriage and conveyor being of a length to bridge said space and to enable the conveyor at the same time to project through both of said openings into the furnaces, the second mentioned furnace also having a doorway through which the conveyor may be projected to enable loading exteriorly of the second mentioned furnace.

In testimony whereof I affix my signature.

WALTER H. HOLT.